(12) United States Patent
Guiles

(10) Patent No.: US 7,182,393 B2
(45) Date of Patent: Feb. 27, 2007

(54) LOW-PROFILE HIGH-STRENGTH VEHICLE DOOR BEAM

(75) Inventor: Melvin J. Guiles, West Olive, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 11/233,284

(22) Filed: Sep. 22, 2005

(65) Prior Publication Data
US 2006/0017305 A1    Jan. 26, 2006

Related U.S. Application Data

(62) Division of application No. 10/772,607, filed on Feb. 5, 2004, now Pat. No. 7,055,886, which is a division of application No. 10/402,462, filed on Mar. 28, 2003, now abandoned.

(51) Int. Cl.
*B60J 5/00* (2006.01)

(52) U.S. Cl. .................... 296/146.6; 293/102

(58) Field of Classification Search ............ 296/146.6, 296/187.12, 190.3, 146.5, 193.05; 29/897.2
See application file for complete search history.

(56) References Cited

U.S. PATENT DOCUMENTS

| | | | | |
|---|---|---|---|---|
| 5,080,427 A | * | 1/1992 | Sturrus et al. ........... | 296/146.6 |
| 5,520,407 A | * | 5/1996 | Alatalo et al. ............ | 29/897.2 |
| 5,756,167 A | * | 5/1998 | Tamura et al. ........... | 296/146.6 |
| 5,813,594 A | * | 9/1998 | Sturrus ..................... | 228/146 |
| 5,813,718 A | * | 9/1998 | Masuda et al. .......... | 296/146.6 |
| 5,934,544 A | * | 8/1999 | Lee et al. .................. | 29/897.2 |
| 6,217,089 B1 | * | 4/2001 | Goto et al. ................ | 293/102 |
| 6,332,302 B1 | * | 12/2001 | Asai ......................... | 296/146.6 |
| 6,428,080 B1 | * | 8/2002 | Ochoa ...................... | 296/146.6 |
| 6,454,884 B1 | * | 9/2002 | McNulty et al. ........... | 148/520 |
| 6,591,576 B1 | * | 7/2003 | Iida et al. .................. | 52/731.6 |
| 6,591,577 B2 | * | 7/2003 | Goto et al. ............... | 296/146.6 |
| 6,663,151 B2 | * | 12/2003 | Mansoor et al. ........... | 293/102 |
| 6,726,261 B2 | * | 4/2004 | Goto et al. ................ | 293/120 |
| 6,767,502 B2 | * | 7/2004 | Porter ....................... | 29/897.2 |
| 6,948,749 B2 | * | 9/2005 | Graber ....................... | 293/102 |

\* cited by examiner

*Primary Examiner*—Kiran B. Patel
(74) *Attorney, Agent, or Firm*—Warner Norcross & Judd LLP (57) ABSTRACT

A vehicle door beam of relatively small profile and high strength. The door beam is fabricated from a web and includes a beam portion and brackets extending from opposite ends of the beam portion. The beam portion includes two lateral portions of the web rolled inwardly into closed configurations, and the two lateral edges of the lateral portions are welded to the beam portion. In an alternative embodiment, a second web is included in the beam portion and is part of both of the closed configurations.

12 Claims, 9 Drawing Sheets

LOW-PROFILE HIGH-STRENGTH VEHICLE DOOR BEAM

This is a divisional of application Ser. No. 10/772,607, filed Feb. 5, 2004 (now U.S. Pat. No. 7,055,886), which is a divisional of application Ser. No. 10/402,462, filed Mar. 28, 2003 which is now abandoned.

BACKGROUND OF THE INVENTION

The present invention relates to vehicle door beams and more particularly to one-piece vehicle door beams.

Vehicle door beams are widely used in the automotive industry to enhance the impact strength of vehicle doors and thereby to enhance passenger safety. Door beams can be manufactured as a single piece. Examples of one-piece beams produced by roll forming are illustrated in co-pending U.S. application Ser. No. 09/822,658 filed Mar. 30, 2001 by Nees and U.S. Pat. No. 5,756,167 issued May 26, 1998 to Tamura et al. Examples of one-piece beams produced by stamping or pressing are illustrated in U.S. Pat. No. 5,183,718 issued Sep. 29, 1998 to Masuda et al and Japanese Patent Publication 4-238725 dated Aug. 26, 1992. While these door beams represented advancements in the art, artisans continue to seek door beams of the desired strength, but with smaller profiles, less material, and/or increased ease of manufacture.

SUMMARY OF THE INVENTION

The aforementioned need is met in the present invention in which a door beam provides a relatively low profile and ease of manufacture, while still meeting the strength requirements of government regulations and vehicle manufacturers. More specifically, the door beam includes a web having two lateral portions rolled into and secured in closed configurations.

In various embodiments, the lateral edges of the lateral portions are connected to various other portions of the door beam. In a first embodiment, the lateral edges are welded to a central portion of the web adjacent one another. In a second embodiment, one lateral edge is welded to a central portion of the web, and the other lateral edge is welded to the first lateral portion along a line separate from the one lateral edge. In a third embodiment, an additional web or leg is secured within the beam, and either or both lateral edges are secured to the additional web.

The defined door beam provides improved strength, enabling reduced profiles and/or lengths. Accordingly, the door beam is usable in a wide variety of applications.

In a preferred embodiment, mounting brackets are integrally formed with the door beam. Such mounting brackets are relatively wide, providing additional options for securing the door beam within a vehicle door.

In another preferred embodiment, the door beam is roll formed. As is known in the art, the door beam can be given a "sweep" or curve, providing additional application options.

These and other objects, advantages, and features of the invention will be more fully understood and appreciated by reference to the detailed description of the preferred embodiments and the drawings.

DETAILED DESCRIPTION OF THE PREFERRED EMBODIMENTS

I. Preferred Embodiment

Figure 1:
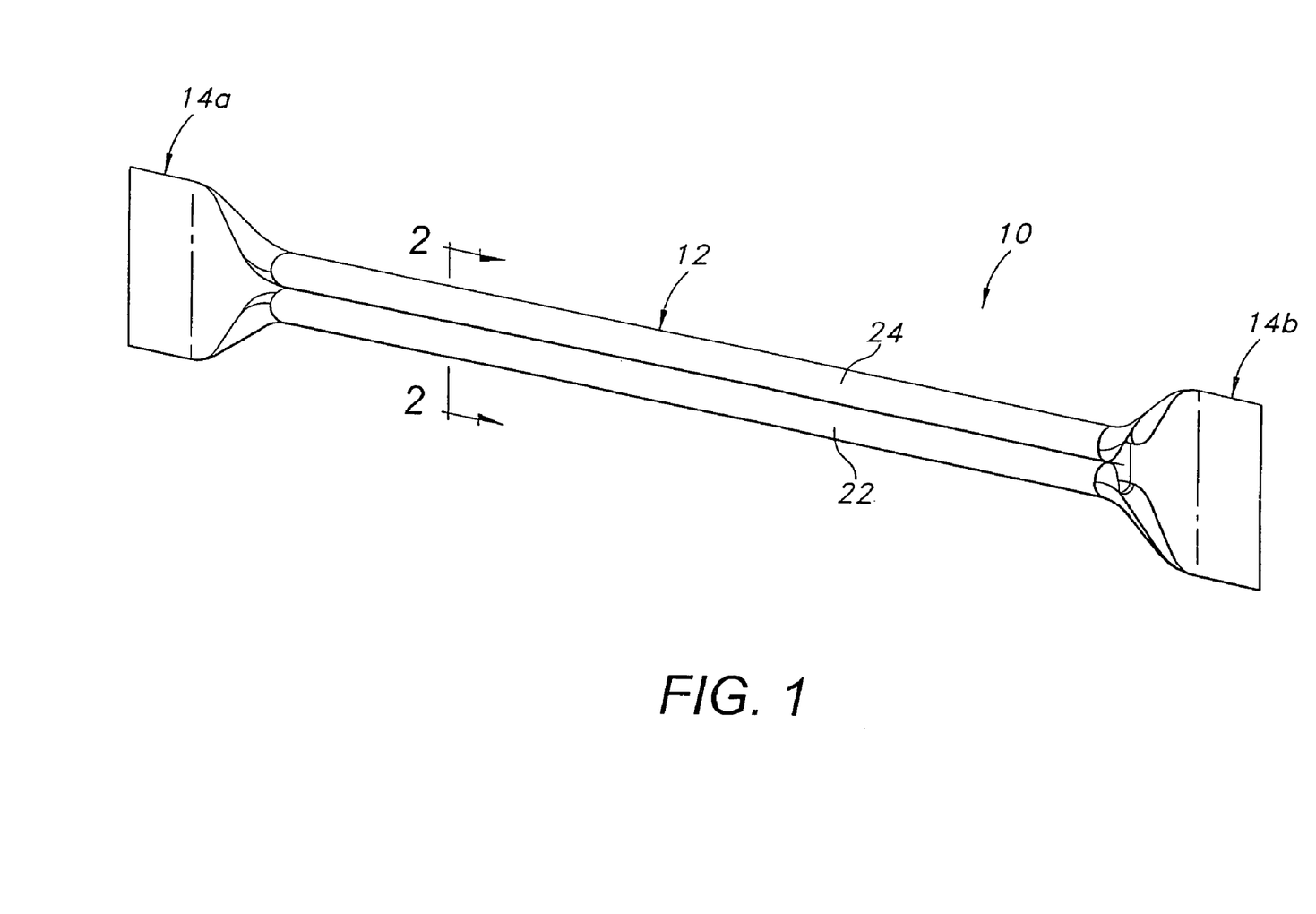
FIG. 1 is a perspective view of the door beam of the present invention.
Figure 2:
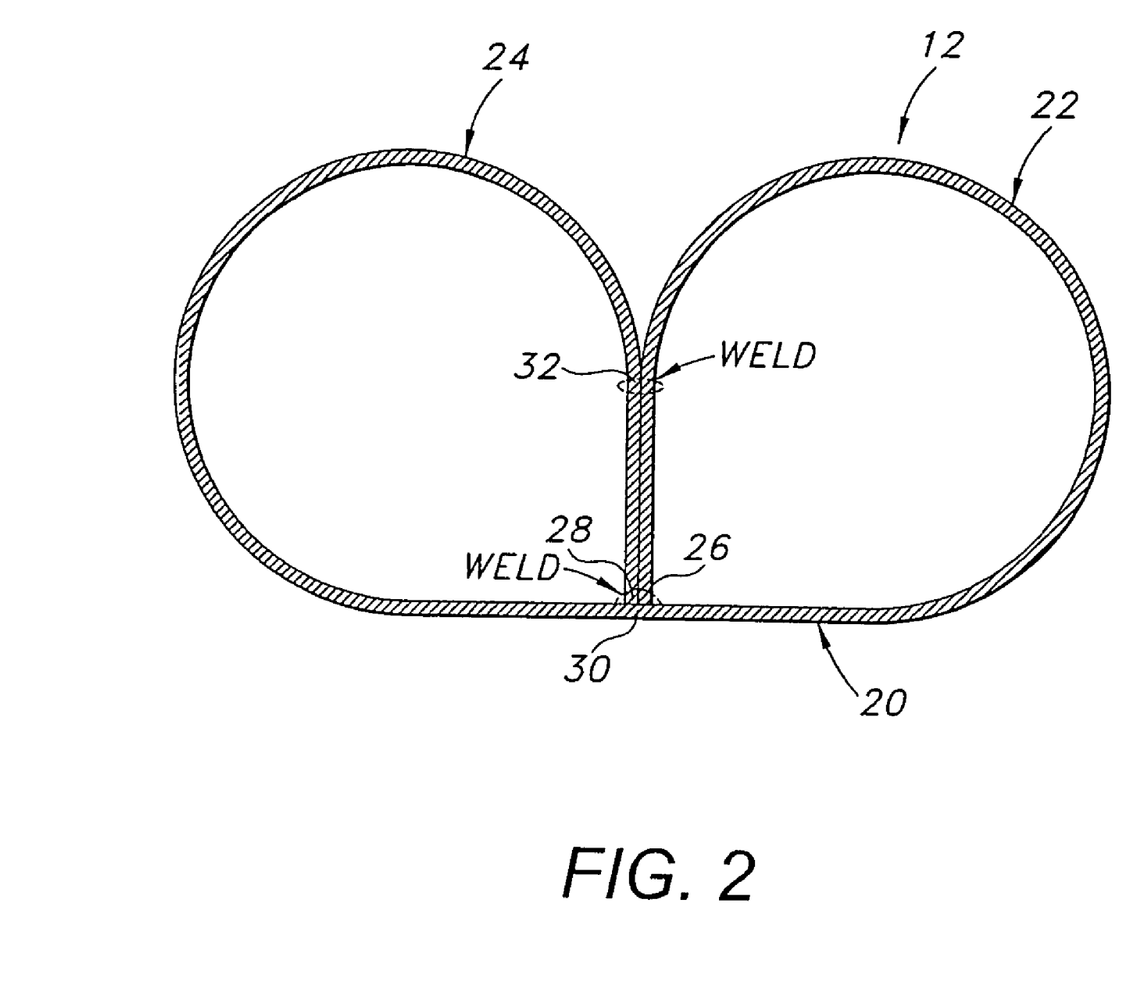
FIG. 2 is a sectional view taken along line II—II in FIG. 1.

A door beam constructed in accordance with a preferred embodiment of the invention is illustrated in FIGS. 1 and 2 and generally designated 10. The door beam includes a beam portion 12 and a pair of brackets 14a and 14b extending from the opposite ends of the beam portion. In the disclosed embodiment, the beam 12 and the brackets 14 are fabricated from a single piece of steel. A wide variety of steels and other suitable materials can be used and will be apparent to those skilled in the art.

The beam portion includes a web 20 which includes a first lateral portion 22 and a second lateral portion 24. The first and second lateral portions include first and second lateral edges 26 and 28, respectively. The first lateral portion 22 forms a closed configuration in which the lateral edge 26 engages a central portion 30 of the web 20, and the second lateral portion 24 forms a closed configuration in which the lateral edge 28 also engages the central portion 30 of the web 20. Both of the lateral edges 26 and 28 are welded or otherwise connected to the central portion 30 of the web 20. As an option, the first and second lateral portions 22 and 24 additionally can be welded together along a line 32 which is separate from the lateral edges 26 and 28. The first and second lateral portions are of similar or generally equal size and result in closed configurations of similar or generally equal size and shape.

The vehicle door beam 10 is fabricated using well-known roll forming techniques. As noted in the Background, the concept of a one-piece vehicle door beam is known in the art, and the specific techniques and steps need not be described in detail.

Figure 3:
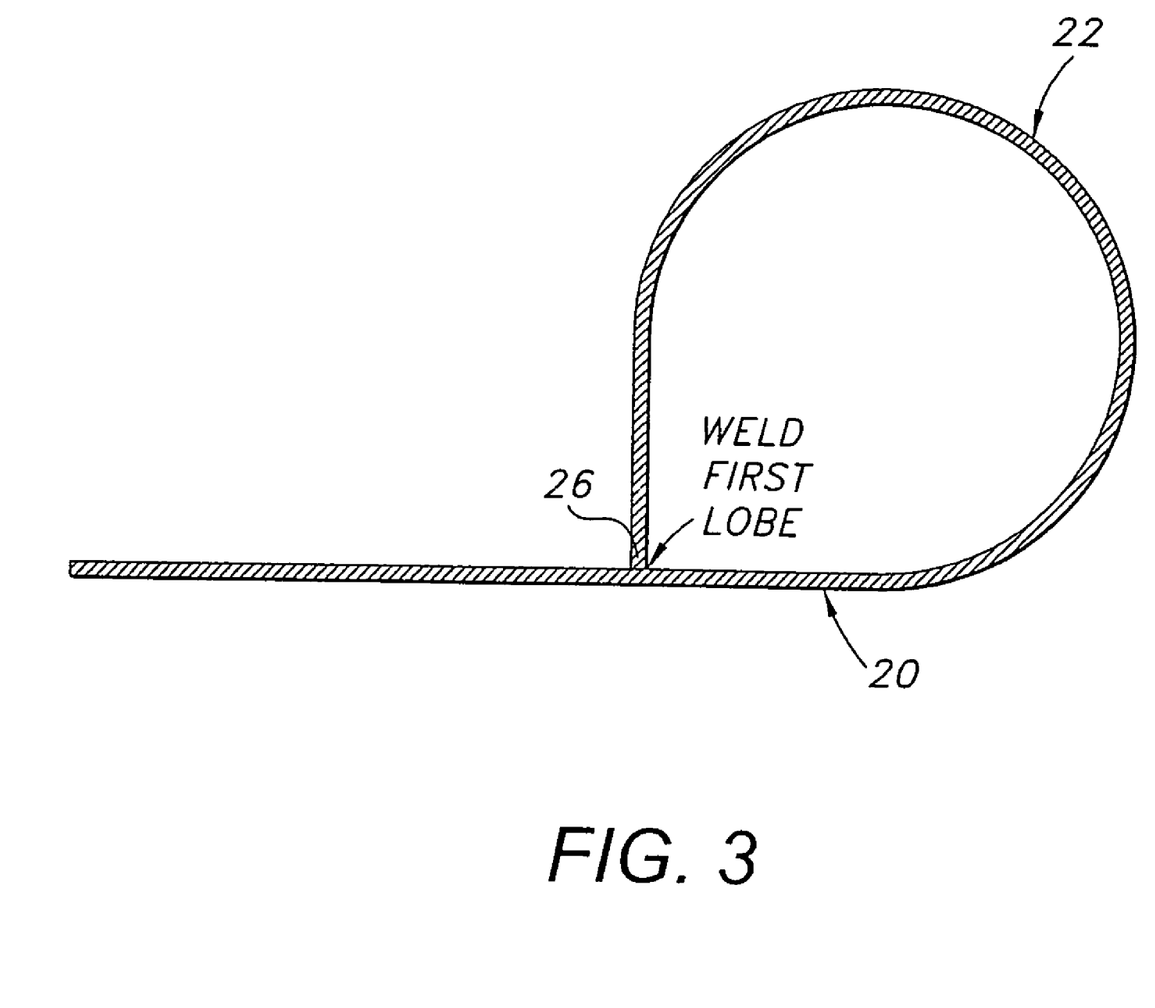
FIG. 3 is a sectional view similar to FIG. 2 but in an intermediate step of manufacture.

As illustrated in FIG. 3, a first step is to roll the first lateral portion 22 upon itself to form a closed configuration in which the lateral edge 26 engages the web 20. The edge 26 is welded to the web to secure the closed configuration. In a second step, the second lateral portion 24 is rolled into a closed configuration in which the lateral edge 28 also engages the web 20 in a location adjacent the first lateral edge 26. The second lateral edge 28 is welded in position to provide the cross-sectional shape illustrated in FIG. 2. Optionally, the first and second lateral portions can be welded together along the line 32.

The present specification uses "welding" to describe the connection of the metal-to-metal connections. Of course, other suitable attachment techniques now know or later developed can be readily substituted for welding. And, the particular attachment techniques will depend on a variety of considerations including material and cost. In all of the welding operations of the disclosed embodiments, the weld can be continuous, intermittent (i.e. a stitch weld), or other series of welds along a line.

II. First Alternative Embodiment

Figure 4:
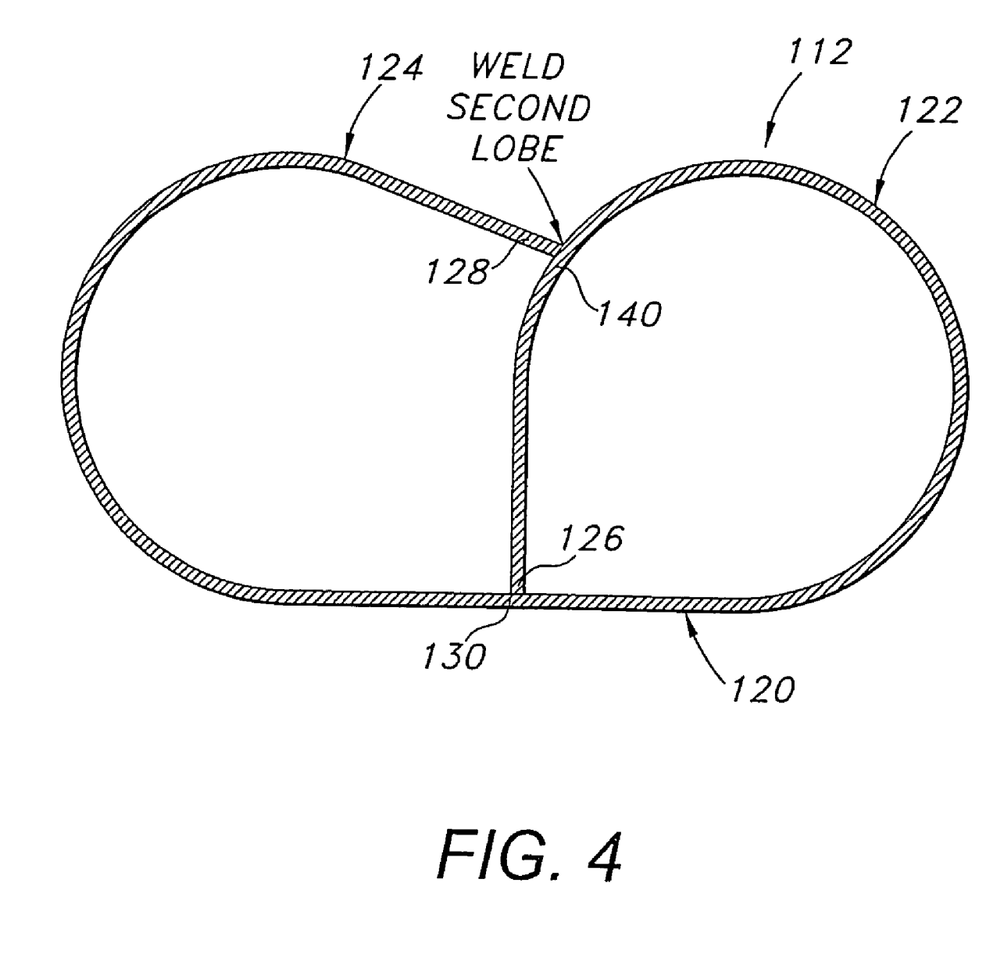
FIG. 4 is a sectional view similar to FIG. 2 showing a first alternative embodiment.

A first alternative embodiment 112 of the vehicle door beam is illustrated in FIG. 4. The beam portion 112 includes a web 120 having a pair of lateral portions 122 and 124. The first lateral portion 122 is generally identical to the first lateral portion 22 described in the preferred embodiment. The second lateral portion 124 is different in that its lateral edge 128 engages the second lateral portion 122 along a line 140 that is separate from the first lateral edge 126. The second lateral edge 128 is welded in position along line 140.

The manufacturing process to create the beam portion 112 is generally similar to that described above in conjunction with beam portion 12.

III. Second Alternative Embodiment

Figure 5:
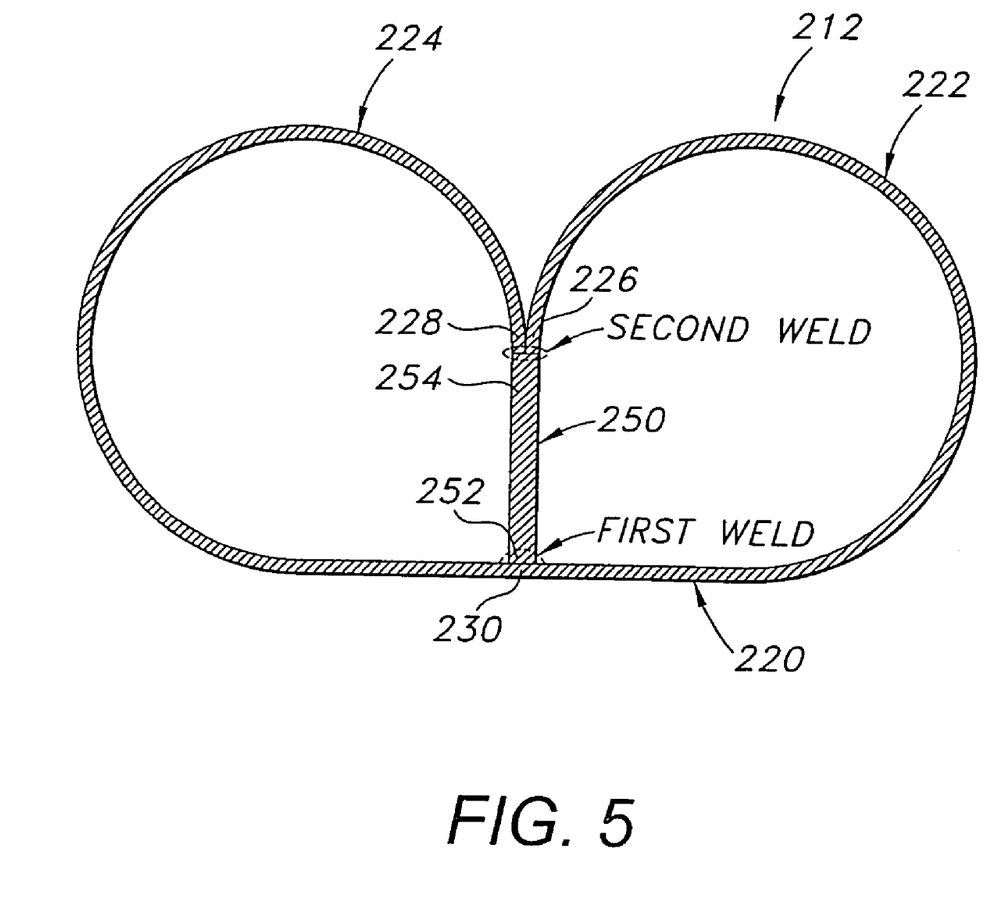
FIG. 5 is a sectional view similar to FIG. 2 showing a second alternative embodiment.

A second alternative embodiment 212 of the beam portion is illustrated in FIG. 5. As with the previous embodiments, the beam portion 212 includes a web 220 having first and second lateral portions 222 and 224. In addition, the beam portion 212 includes an additional web or leg 250 having opposite first and second edges 252 and 254. The first lateral edge 252 is welded to the central portion 230 of the web 220. The first and second lateral edges 226 and 228 are welded to the second edge 254 of the leg 250.

Figure 6:
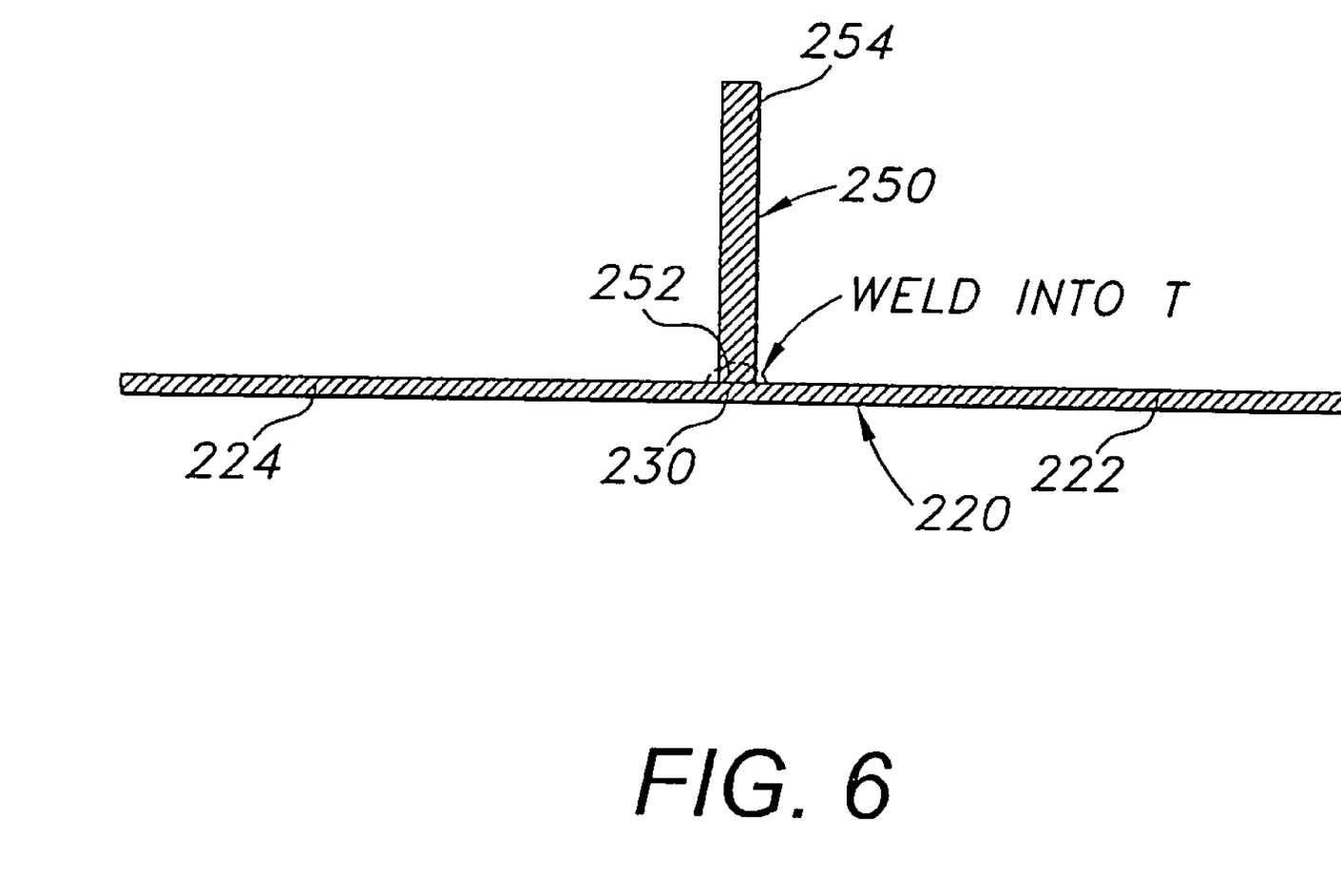
FIG. 6 is a sectional view similar to FIG. 5 but in an intermediate step of manufacture.

Again, the manufacturing techniques used to fabricate the beam 212 are generally similar to those described above. As a specific step illustrated in FIG. 6, the leg 250 is attached to the web 220 at the central location 230. In subsequent manufacturing steps (not illustrated), the first and second lateral portions 222 and 224 are rolled into closed configurations engaging and connected to the second edge 254 of the leg 250 to complete the construction illustrated in FIG. 5.

IV. Third Alternative Embodiment

Figure 7:
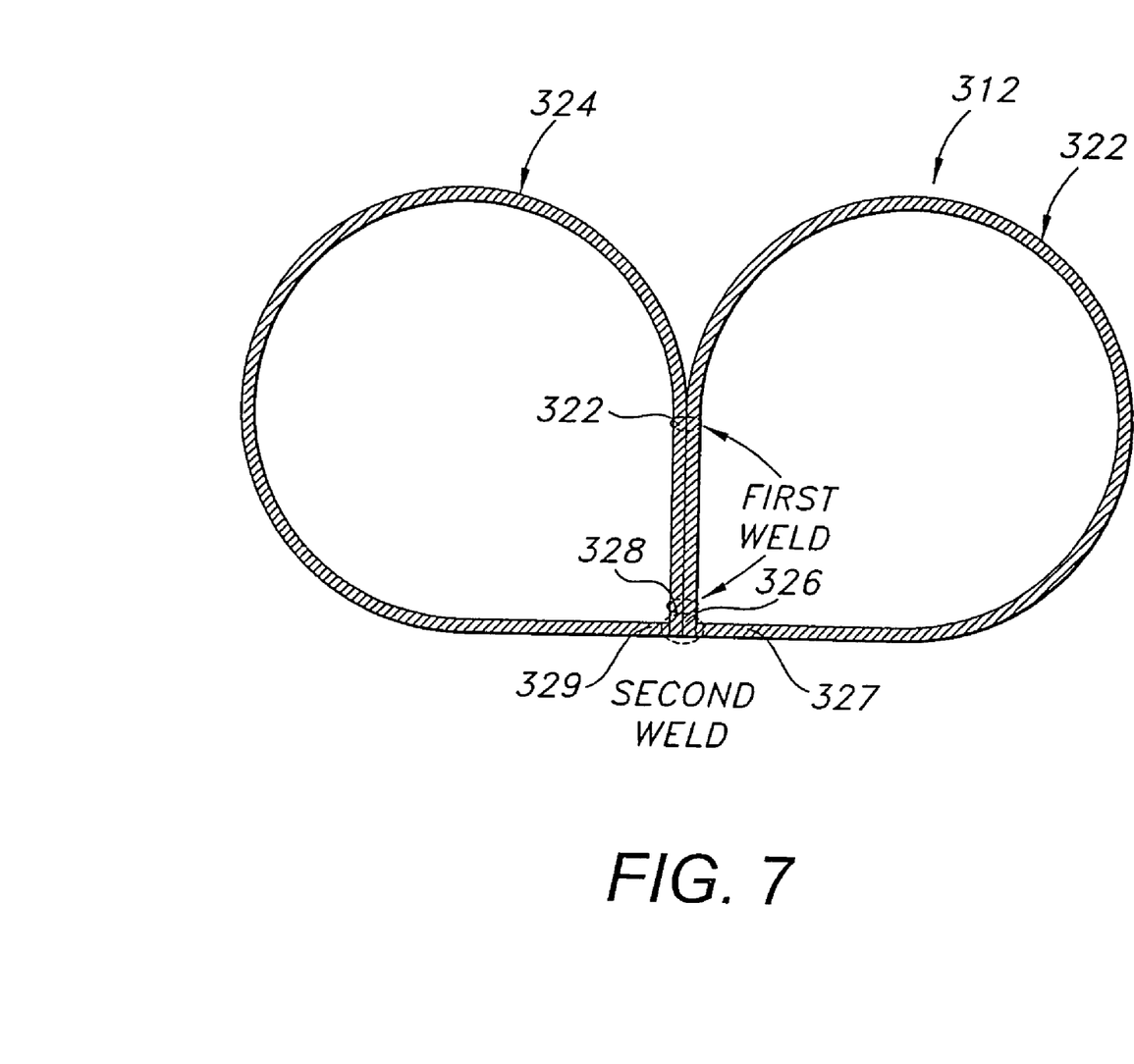
FIG. 7 is a sectional view of a third alternative embodiment.

A third alternative embodiment 312 of the vehicle door beam is illustrated in FIG. 7. The beam portion 312 includes a first lateral portion 322 and a second lateral portion 324. The two lateral portions 322 and 324 are not part of a single web, but rather are separate connected pieces. The first lateral portion 322 is a closed configuration wherein the lateral edge 327 engages and is welded to the lateral edge 326, and the second lateral portion 324 is a closed configuration in which the lateral edge 329 engages and is welded to the lateral edge 328. Additionally, the two lateral portions are welded together along lines 332 and 333.

Figure 8:
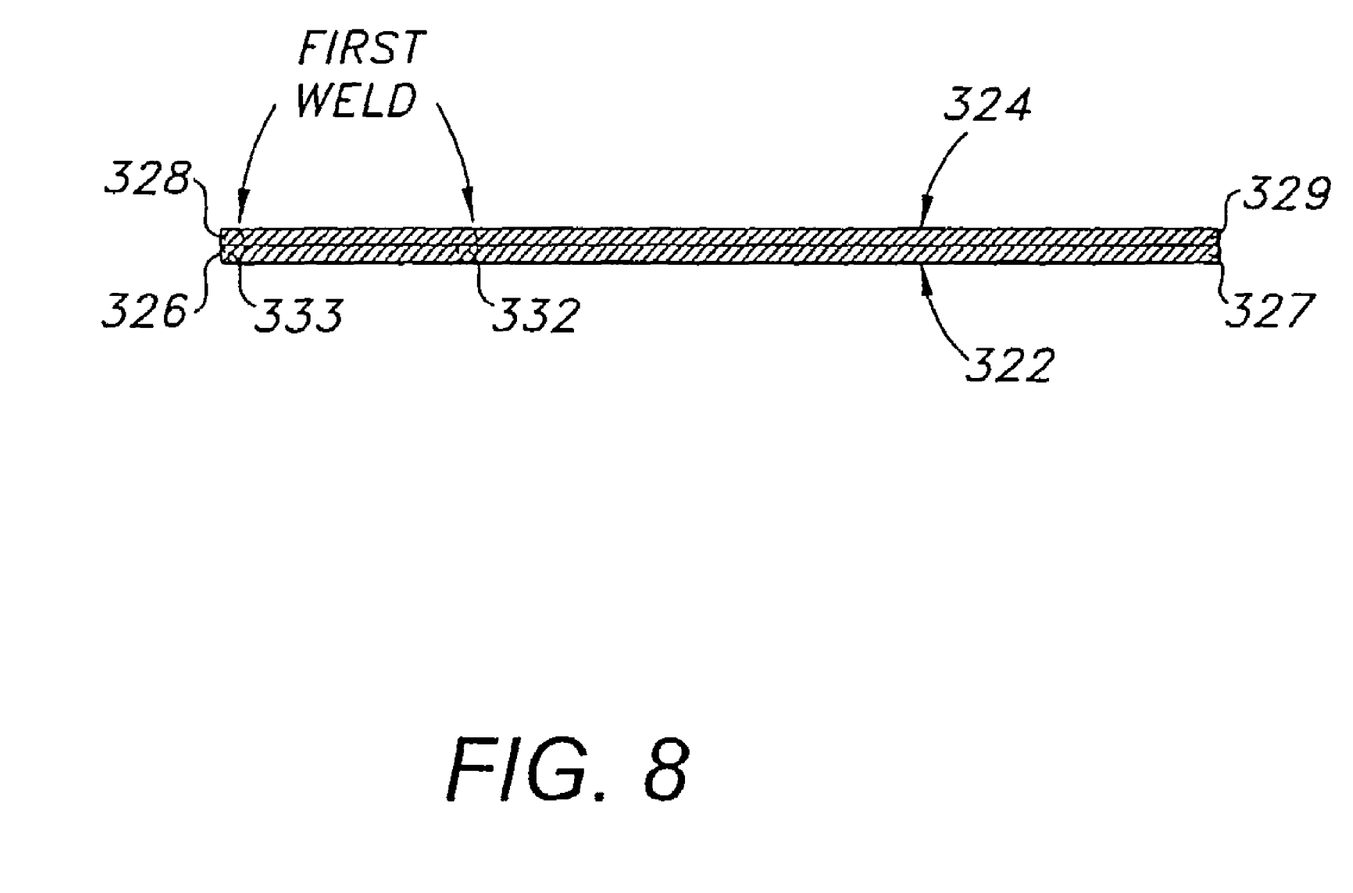
FIG. 8 is a sectional view similar to FIG. 7 but in a first intermediate step of manufacture.
Figure 9:
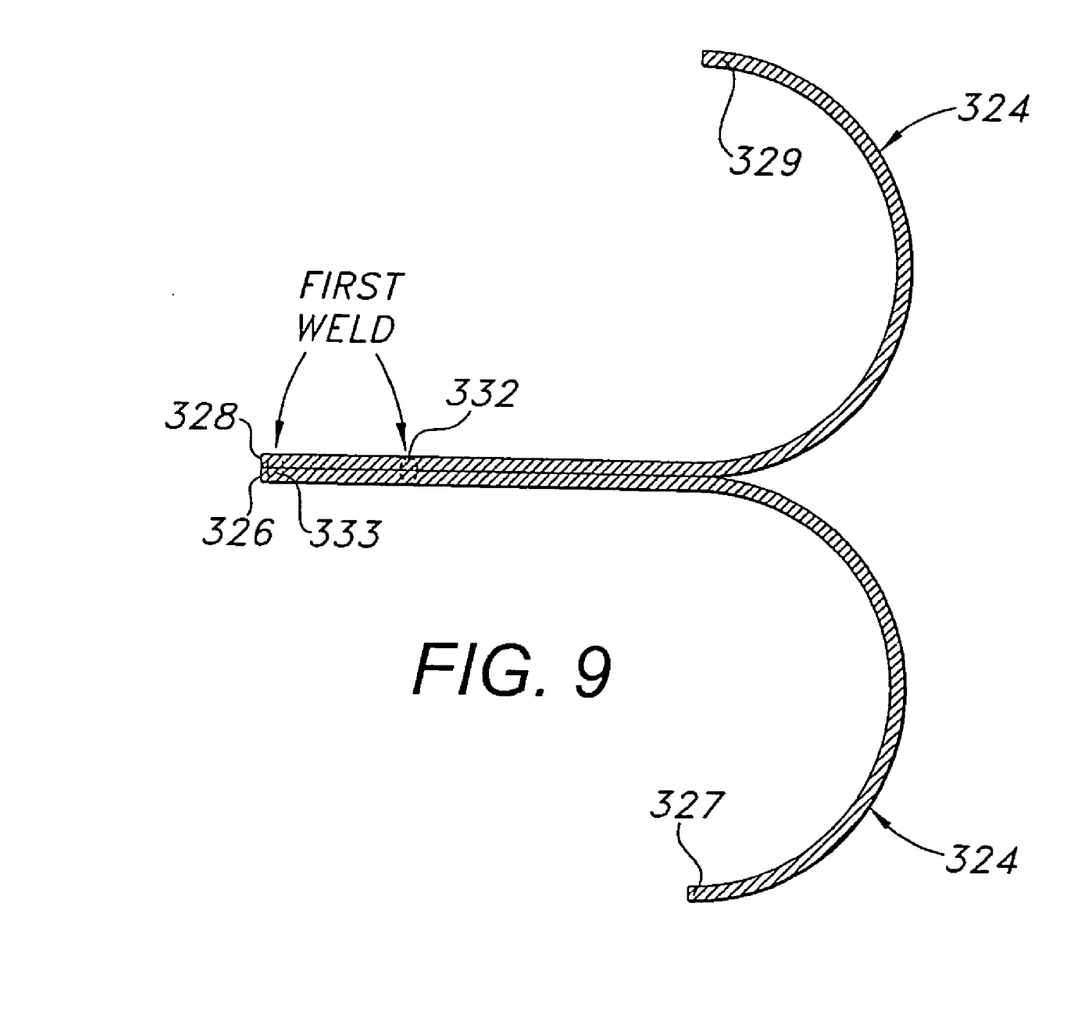
FIG. 9 is a sectional view similar to FIG. 7 but in a second intermediate step of manufacture.

FIGS. 8 and 9 show two intermediate steps in fabricating the beam portion 312 illustrated in FIG. 7. In FIG. 8, the two lateral portions 322 and 324 are pieces of flat stock laid against one another. The two pieces are welded or otherwise connected along lines 332 and 333. FIG. 9 illustrates a subsequent step in which the two lateral portions 322 and 324 are being formed into their closed configurations. Ultimately, the lateral edges 327 and 329 engage lateral edges 326 and 328 respectively and are welded thereto to complete the beam portion 312 illustrated in FIG. 7.

V. Conclusion

In all of the described embodiments, the profile of the beam portion is relatively small, and yet the beam meets or exceeds governmental regulations and vehicle manufacturer requirements. Also, door beams constructed in accordance with the present invention can be longer than those of the prior art. When roll formed, the door beams can be given a "sweep" or curve. Further when roll formed, the mounting brackets are relatively wide, providing increased surface attachment area. All of these advantages enable the present door beam to be used in a variety of applications in which prior art beams cannot be used. Therefore, the present invention enables a wider variety of vehicle door designs.

The above descriptions are those of preferred embodiments of the invention. Various alterations and changes can be made without departing from the spirit and broader aspects of the invention as defined in the appended claims, which are to be interpreted in accordance with the principles of patent law, including the doctrine of equivalents.

The invention claimed is:

1. A method of fabricating a vehicle door beam comprising the steps of:

rolling a first lateral portion of a web so that a first lateral edge abuts the web;

connecting the first lateral edge to the web;

rolling a second lateral portion of the web so that a second lateral edge abuts the web adjacent to the first lateral edge; and connecting the second lateral edge to the web.

2. The method defined in claim 1 wherein the lateral portions arc connected together along a line separate from the first and second lateral edges.

3. The method defined in claim 1 wherein the first and second lateral portions are approximately the same size.

4. A method of fabricating a vehicle door beam comprising the steps of:

forming a first closed configuration in a piece with a first lateral edge abutting the piece;

connecting the first lateral edge along its longitudinal extent to the piece;

forming a second closed configuration in the piece with a second lateral edge abutting the piece adjacent to the first lateral edge; and connecting the second lateral edge along its longitudinal extent to the piece.

5. The method defined in claim 4 wherein said forming steps include forming the first and second closed configurations from the same integral piece.

6. The method defined in claim 5 further comprising welding the first and second closed configurations together along a line separate from the first and second edges.

7. A method as defined in claim 5 wherein:

said first forming step includes engaging the first lateral edge on the first closed configuration with the piece; and said second forming step includes engaging the second lateral edge on the second closed configuration with the first closed configuration.

8. A method as defined in claim 5 wherein:

said first forming step includes using a second piece in the first closed configuration; and said second forming step includes using the second piece in the second closed configuration, whereby the second piece is common to both the first and second closed configuration.

9. A method as defined in claim 8 wherein:

said first forming step includes engaging the first lateral edge on the first closed configuration with the second piece; and said second forming step includes engaging the second lateral edge on the second closed configuration with the second piece.

10. A method as defined in claim 8 wherein:
said first forming step includes engaging the first lateral edge on the first closed configuration with the second piece; and
said second forming step includes engaging the second lateral edge on the second closed configuration with the first closed configuration.

11. A method as defined in claim 4 wherein the first and second closed configurations are two separate but connected pieces.

12. A method of fabricating a vehicle doorbeam comprising the steps of:
rolling a first lateral portion of a beam portion such that it includes a perpendicular portion perpendicular to a lateral middle portion of the beam portion, and a transition portion curving continuously from the middle portion to the perpendicular portion, the first lateral portion having a first lateral edge that abuts the middle portion;
rolling a second lateral portion such that it includes a perpendicular portion perpendicular to the middle portion, and a transition portion curving continuously from the middle portion to the perpendicular portion, the second lateral portion having a second lateral edge that abuts the middle portion adjacent to the first lateral edge;
forming he perpendicular portions into engagement with each other; and
connecting the first and second lateral edges to the middle portion of the beam portion.

* * * * *